(12) United States Patent
Riccomini et al.

(10) Patent No.: US 11,707,115 B2
(45) Date of Patent: Jul. 25, 2023

(54) AUTOMATED FOOTWEAR LACING SYSTEMS, DEVICES, AND TECHNIQUES

(71) Applicant: NIKE, Inc., Beaverton, OR (US)

(72) Inventors: Robert A. Riccomini, Beaverton, OR (US); Hardy Shen, Beaverton, OR (US); Stan Reyes, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 1188 days.

(21) Appl. No.: 15/993,904

(22) Filed: May 31, 2018

(65) Prior Publication Data

US 2018/0343977 A1  Dec. 6, 2018

Related U.S. Application Data

(60) Provisional application No. 62/513,213, filed on May 31, 2017.

(51) Int. Cl.
*A43B 3/34* (2022.01)
*A43C 11/16* (2006.01)
(Continued)

(52) U.S. Cl.
CPC .............. *A43C 11/165* (2013.01); *A43B 3/34* (2022.01); *A43C 1/00* (2013.01); *A43C 7/08* (2013.01); *B65H 59/00* (2013.01); *B65H 69/00* (2013.01); *B65H 75/368* (2013.01); *B65H 75/4428* (2013.01); *B65H 75/4484* (2013.01);
(Continued)

(58) Field of Classification Search
CPC .. G01D 5/24; A43B 3/001; A43C 7/00; A43C 11/00; A43C 11/165
See application file for complete search history.

(56) References Cited

U.S. PATENT DOCUMENTS 5,117,893 A * 6/1992 Morrison .................. E06B 9/86
160/133
5,152,038 A   10/1992 Schoch
(Continued)

FOREIGN PATENT DOCUMENTS

CA   2998546   4/2017
CN   1096572   12/1994
(Continued)

OTHER PUBLICATIONS

"International Application Serial No. PCT/US2018/035287, International Search Report dated Nov. 30, 2018", 4pgs.
(Continued)

*Primary Examiner* — Jason W San
(74) *Attorney, Agent, or Firm* — Schwegman, Lundberg & Woessner, P.A.

(57) ABSTRACT

The specification discusses various lacing engine configurations for use in an automated footwear platform. For example, lacing engines with mechanisms to detect lace cable position and/or lace cable tensions are discussed. In an example, the lacing engine can include a housing, a lace spool and a detection mechanism. The lace spool can be at least partially disposed within the housing, and be adapted to collect a portion of the lace cable in response to rotation in a first direction during tightening of the footwear platform. The detection mechanism can detect a state of the lace cable manipulated by the lacing engine.

18 Claims, 10 Drawing Sheets

(51) Int. Cl.
| | |
|---|---|
| *B65H 59/00* | (2006.01) |
| *B65H 69/00* | (2006.01) |
| *A43C 1/00* | (2006.01) |
| *F16H 1/28* | (2006.01) |
| *A43C 7/08* | (2006.01) |
| *B65H 75/44* | (2006.01) |
| *B65H 75/36* | (2006.01) |
| *F16G 11/00* | (2006.01) |
| *F16G 11/10* | (2006.01) |
| *F16G 11/12* | (2006.01) |
| *F16G 11/14* | (2006.01) |

(52) U.S. Cl.
CPC ............ *F16G 11/00* (2013.01); *F16H 1/2863* (2013.01); *B65H 2403/46* (2013.01); *B65H 2511/411* (2013.01); *B65H 2515/31* (2013.01); *B65H 2553/20* (2013.01); *B65H 2701/39* (2013.01); *F16G 11/106* (2013.01); *F16G 11/12* (2013.01); *F16G 11/14* (2013.01); *Y10T 24/34* (2015.01); *Y10T 24/3724* (2015.01)

(56) References Cited

U.S. PATENT DOCUMENTS

| | | | |
|---|---|---|---|
| 5,600,874 A | 2/1997 | Jungkind | |
| 6,032,387 A * | 3/2000 | Johnson | A43C 11/16 36/118.1 |
| 7,617,573 B2 * | 11/2009 | Chen | A43C 1/00 24/712.9 |
| 7,721,468 B1 * | 5/2010 | Johnson | A43C 1/06 36/118.1 |
| 7,752,774 B2 * | 7/2010 | Ussher | A43C 11/165 36/138 |
| 7,954,204 B2 * | 6/2011 | Hammerslag | A43C 11/16 36/50.5 |
| 8,231,074 B2 * | 7/2012 | Hu | A43C 11/20 242/388.2 |
| 8,245,371 B2 * | 8/2012 | Chen | A43C 11/16 24/713.2 |
| 8,468,657 B2 * | 6/2013 | Soderberg | A43C 1/06 242/395 |
| 8,516,662 B2 * | 8/2013 | Goodman | B65H 75/4431 36/50.5 |
| 9,101,181 B2 * | 8/2015 | Soderberg | A43C 11/165 |
| 9,248,040 B2 * | 2/2016 | Soderberg | A43C 7/00 |
| 9,629,417 B2 * | 4/2017 | Cavanagh | A43C 11/165 |
| 9,681,705 B2 * | 6/2017 | Trudel | F16G 11/12 |
| 9,706,814 B2 * | 7/2017 | Converse | A61F 5/0123 |
| 10,111,496 B2 * | 10/2018 | Schneider | A43C 11/16 |
| 2003/0150135 A1 | 8/2003 | Liu | |
| 2003/0204938 A1 * | 11/2003 | Hammerslag | A43C 11/004 24/68 SK |
| 2005/0247813 A1 * | 11/2005 | Kovacevich | A42B 3/08 242/395 |
| 2006/0156584 A1 | 7/2006 | Johnson | |
| 2007/0084956 A1 * | 4/2007 | Chen | A43C 7/00 242/388.6 |
| 2008/0066346 A1 | 3/2008 | Hammerslag et al. | |
| 2008/0196224 A1 * | 8/2008 | Hu | A43C 11/20 24/68 SK |
| 2008/0301919 A1 | 12/2008 | Ussher | |
| 2009/0172928 A1 * | 7/2009 | Messmer | A43C 11/16 242/407.1 |
| 2010/0139057 A1 | 6/2010 | Soderberg et al. | |
| 2010/0299959 A1 | 12/2010 | Hammerslag et al. | |
| 2011/0162236 A1 * | 7/2011 | Voskuil | A43B 3/0078 24/713.6 |
| 2011/0191992 A1 * | 8/2011 | Chen | A43C 11/16 24/713.2 |
| 2011/0197362 A1 * | 8/2011 | Chella | A61F 5/3761 5/650 |
| 2011/0266384 A1 | 11/2011 | Goodman et al. | |
| 2011/0303782 A1 * | 12/2011 | Hu | A43C 11/20 242/388 |
| 2012/0004587 A1 * | 1/2012 | Nickel | A61F 5/028 602/5 |
| 2012/0204381 A1 * | 8/2012 | Ingimundarson | A41F 1/04 24/71.1 |
| 2012/0228419 A1 * | 9/2012 | Chen | A43C 11/165 242/395 |
| 2014/0068838 A1 | 3/2014 | Beers et al. | |
| 2014/0082933 A1 | 3/2014 | Beers | |
| 2015/0250268 A1 | 9/2015 | Alt et al. | |
| 2016/0345654 A1 * | 12/2016 | Beers | A43B 23/07 |
| 2017/0027287 A1 * | 2/2017 | Burns | A43C 11/20 |
| 2017/0055626 A1 | 3/2017 | Rushbrook | |
| 2017/0265577 A1 * | 9/2017 | Schneider | A43C 1/00 |
| 2017/0265592 A1 * | 9/2017 | Schneider | B65H 75/14 |
| 2017/0265594 A1 * | 9/2017 | Walker | A61B 5/6807 |
| 2017/0267485 A1 * | 9/2017 | Schneider | A43C 7/00 |
| 2018/0020767 A1 * | 1/2018 | Dyer | A43B 3/26 36/97 |
| 2018/0199674 A1 * | 7/2018 | Walker | A43B 3/0031 |
| 2018/0228244 A1 * | 8/2018 | Dyer | A43B 23/0245 |
| 2018/0289110 A1 * | 10/2018 | Bock | A43B 3/34 |
| 2018/0368526 A1 * | 12/2018 | Bock | A43C 11/00 |
| 2019/0254383 A1 * | 8/2019 | Beers | A43C 1/00 |
| 2019/0380446 A1 * | 12/2019 | Jeon | A43C 7/00 |
| 2019/0380856 A1 * | 12/2019 | Hammerslag | A43C 11/14 |
| 2020/0077748 A1 * | 3/2020 | Dyer | A43C 7/08 |
| 2020/0085144 A1 * | 3/2020 | Chiou | A43C 1/003 |
| 2021/0330036 A1 * | 10/2021 | Labelle | A43C 11/006 |
| 2022/0110401 A1 * | 4/2022 | Crumbleholme | A43B 13/223 |

FOREIGN PATENT DOCUMENTS

| | | |
|---|---|---|
| CN | 2613167 | 4/2004 |
| CN | 1618363 | 5/2005 |
| CN | 1758862 | 4/2006 |
| CN | 101193568 | 6/2008 |
| CN | 101784210 | 7/2010 |
| CN | 102132983 | 7/2011 |
| CN | 103153112 | 6/2013 |
| CN | 103476288 | 12/2013 |
| CN | 104585975 | 5/2015 |
| CN | 104839942 | 8/2015 |
| CN | 105581438 | 5/2016 |
| CN | 105722419 | 6/2016 |
| CN | 111315249 | 6/2020 |
| CN | 111615344 | 9/2020 |
| CN | 111629625 | 9/2020 |
| CN | 113662314 A | 11/2021 |
| CN | 111629625 B | 12/2021 |
| CN | 111615344 | 4/2022 |
| CN | 114304812 | 4/2022 |
| CN | 111315249 B | 7/2022 |
| CN | 11510481 | 9/2022 |
| EP | 3629820 | 4/2020 |
| EP | 3629821 | 4/2020 |
| EP | 3629820 B1 | 8/2022 |
| FR | 3038815 A1 | 1/2017 |
| JP | 3165581 | 1/2011 |
| JP | 2016039921 | 3/2016 |
| KR | 20150131485 | 11/2015 |
| TW | 201429420 | 8/2014 |
| WO | 2010059989 | 5/2010 |
| WO | 2015042216 | 3/2015 |
| WO | 2015054722 | 4/2015 |
| WO | 2016195957 | 12/2016 |
| WO | WO-2016191123 A1 | 12/2016 |
| WO | WO-2018170148 A2 * | 9/2018 ........... A43B 1/0054 |
| WO | WO-2018222805 A2 | 12/2018 |
| WO | WO-2018222836 A2 | 12/2018 |
| WO | 2018222805 | 1/2019 |

OTHER PUBLICATIONS

"International Application Serial No. PCT/US2018/035287, Written Opinion dated Nov. 30, 2018", 4 pgs.

(56) References Cited

OTHER PUBLICATIONS

"International Application Serial No. PCT/US2018/035341, International Search Report dated Nov. 30, 2018", 5 pgs.

"International Application Serial No. PCT/US2018/035341, Written Opinion dated Nov. 30, 2018", 10 pgs.

"European Application Serial No. 18810465.7, Response to Communication pursuant to Rules 161 and 162 filed Jun. 25, 2020", 12 pgs.

"European Application Serial No. 18810542.3, Extended European Search Report, dated Feb. 1, 2021", 7 pgs.

"European Application Serial No. 18810465.7, Extended European Search Report dated Apr. 9, 2021", 7 pages.

"Chinese Application Serial No. 201880048175.6, Notification to Make Divisional Application dated Mar. 31, 2021", With English translation, 8 pages.

"European Application Serial No. 18809615.0, Communication pursuant to Rule 164(1) EPC dated Apr. 16, 2021", 13 pages.

"Chinese Application Serial No. 201880048164.8, Office Action dated Apr. 12, 2021", With English translation, 13 pages.

"Chinese Application Serial No. 201880048319.8, Office Action dated May 7, 2021", With English translation, 23 pages.

"European Application Serial No. 18809615.0, Extended European Search Report dated Jul. 27, 2021", 12 pages.

"Chinese Application Serial No. 201880048175.6, Response filed Aug. 16, 2021 to Notification to Make Divisional Application dated Mar. 31, 2021", With current English claims, 9 pages.

"Chinese Application Serial No. 201880048164.8, Response Filed Aug. 12, 2021 toOffice Action dated Apr. 12, 2021", With English claims, 10 pages.

"European Application Serial No. 18810465.7, Response filed Nov. 8, 2021 to Extended European Search Report dated Apr. 9, 2021", 44 pgs.

"Chinese Application Serial No. 201880048164.8, Response filed Sep. 9, 2021 to Examiner Telephone Interview", w English claims, 8 pgs.

"European Application Serial No. 18810542.3, Response filed Aug. 18, 2021 to Extended European Search Report dated Feb. 1, 2021", 32 pgs.

"Chinese Application Serial No. 201880048319.8, Response filed Sep. 22, 2021 to Office Action dated May 7, 2021", w English claims, 45 pgs.

"Chinese Application Serial No. 201880048175.6, Office Action dated Sep. 16, 2021", With English translation, 10 pgs.

"International Application Serial No. PCT US2018 035287, International Preliminary Report on Patentability dated Dec. 12, 2019", 6 pgs.

"International Application Serial No. PCT US2018 035289, International Preliminary Report on Patentability dated Dec. 12, 2019", 8 pgs.

"International Application Serial No. PCT US2018 035341, International Preliminary Report on Patentability dated Dec. 12, 2019", 12 pgs.

"European Application Serial No. 18809615.0, Response to Communication Pursuant to Rules 161 and 162 filed Jun. 25, 2020", 11 pgs.

"European Application Serial No. 18810542.3, Response to Communication Pursuant to Rules 161 and 162 filed Jun. 25, 2020", 10 pgs.

"European Application Serial No. 18809615.0, Response Filed Feb. 23, 2022 to Extended European Search Report dated Jul. 27, 2021", 26 pgs.

"Chinese Application Serial No. 202110936034.1, Voluntary Amendment filed Mar. 10, 2022", With English claims, 10 pgs.

"Chinese Application Serial No. 201880048175.6, Response filed Apr. 1, 2022 to Office Action dated Sep. 16, 2021", w English claims, 34 pgs.

"Chinese Application Serial No. 202210367249.0, Notification to Make Rectification dated Jun. 23, 2022", With English translation, 3 pgs.

"Chinese Application Serial No. 202110936034.1, Office Action dated Jul. 29, 2022", w English translation, 11 pgs.

"Chinese Application Serial No. 202111515691.5, Voluntary Amendment filed Aug. 3, 2022", w/ English Claims, 8 pgs.

"Chinese Application Serial No. 202210367249.0, Response filed Aug. 23, 2022 to Notification to Make Rectification dated Jun. 23, 2022", w/ English Claims, 24 pgs.

"European Application Serial No. 22184045.7, Extended European Search Report dated Dec. 6, 2022", 7 pgs.

"European Application Serial No. 22184045.7, Response filed Sep. 29, 2022 to Invitation to Remedy Deficiencies (R. 58 EPC) mailed", 7 pgs.

"Chinese Application Serial No. 202110936034.1, Response filed Feb. 13, 2023 to Office Action dated Jul. 29, 2022", w/ English claims, 10 pgs.

* cited by examiner

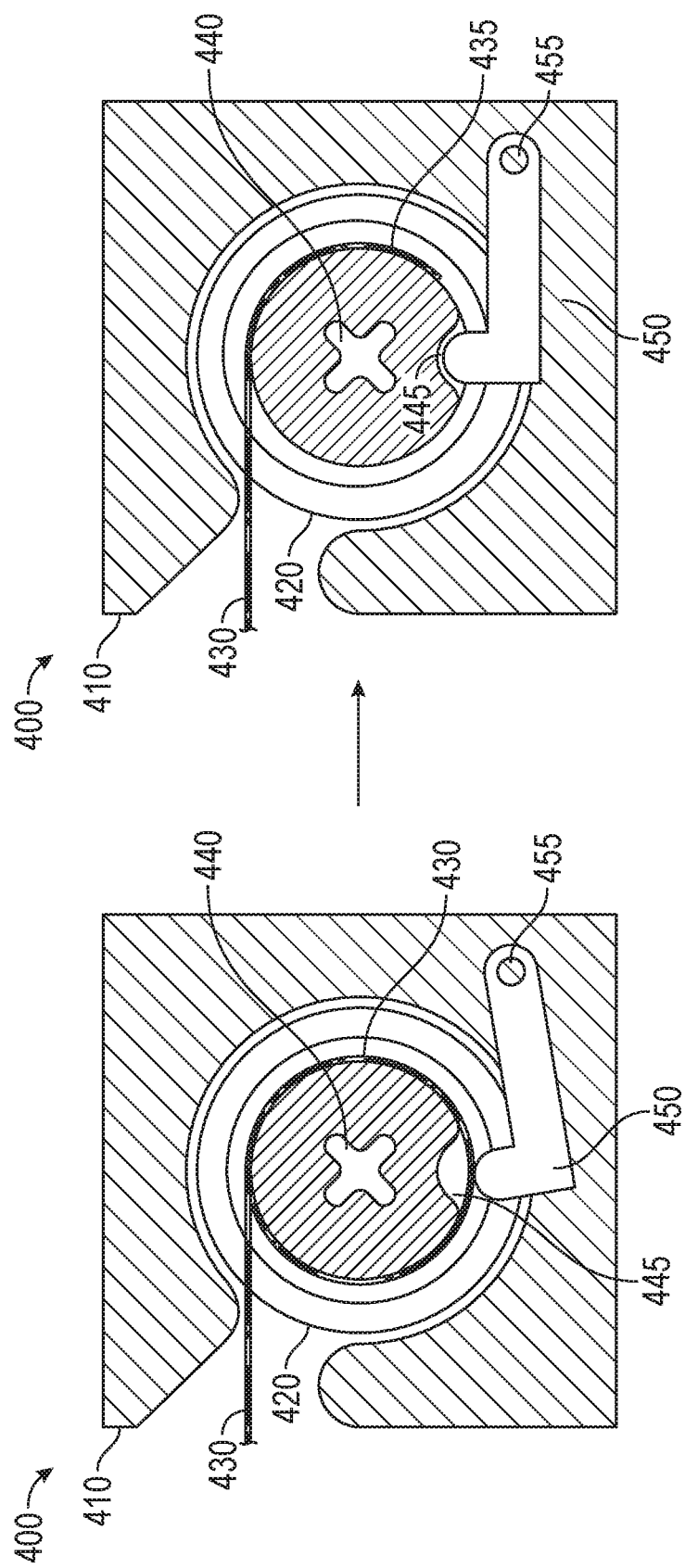

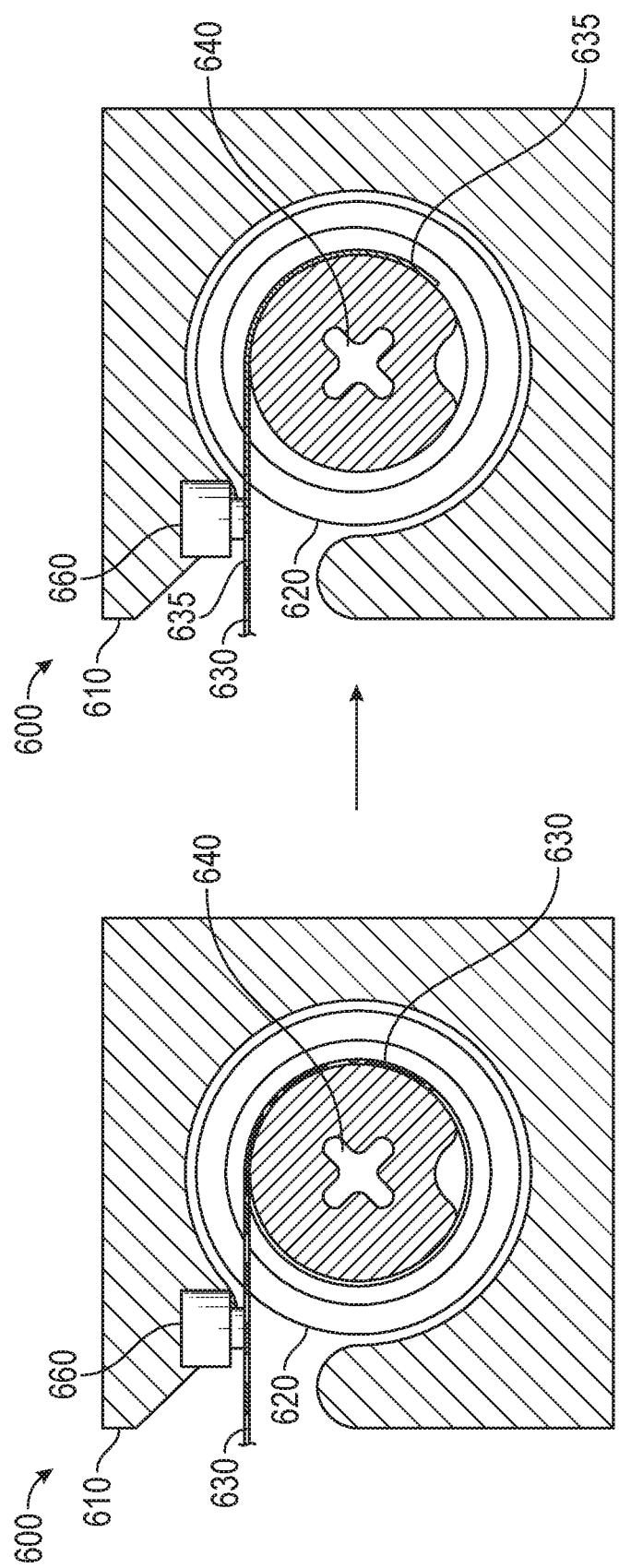

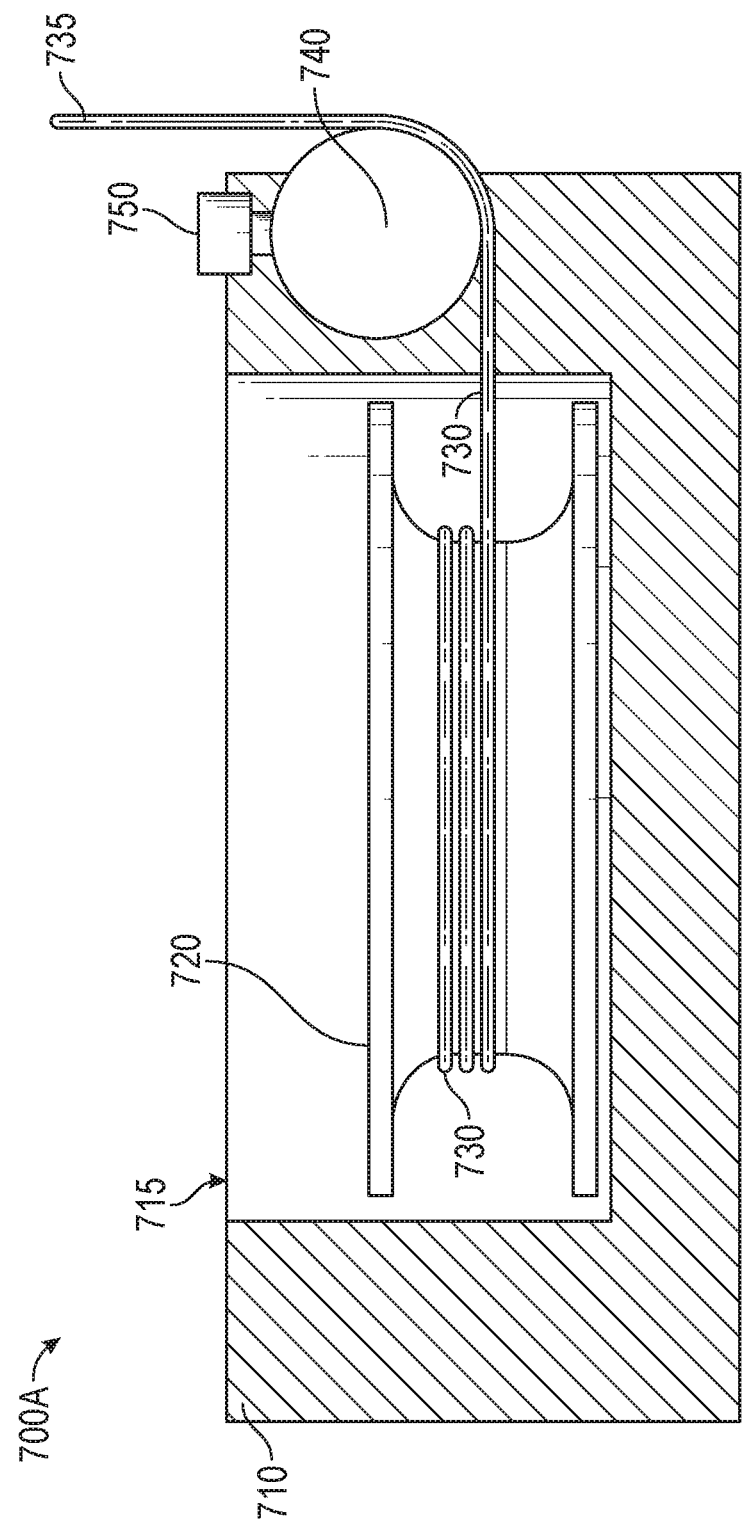

AUTOMATED FOOTWEAR LACING SYSTEMS, DEVICES, AND TECHNIQUES

PRIORITY APPLICATIONS

This application claims the benefit of priority to U.S. Provisional Patent Application Ser. No. 62/513,213, filed May 31, 2017, the content of which is incorporated by reference herein in its entirety.

FIELD OF THE INVENTION

The following specification describes various aspects of a footwear assembly involving a lacing system including a motorized or non-motorized lacing engine, footwear components related to the lacing engines, automated lacing footwear platforms, and related concepts. More specifically, much of the following specification describes various aspects of lacing engine architectures (configurations) for use in footwear including motorized or non-motorized automated lace tightening. The specification may also discuss related concepts, such as battery charging devices, storage and delivery packaging, as well as footwear user interfaces.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4A-4B are diagrams illustrating a lever and divot assembly for detecting lace position or end of travel within an automated footwear platform, in accordance with some example embodiments.

FIGS. 6A-6B are diagrams illustrating an optical sensor assembly to detect different markings on a lace cable within an automated footwear platform, in accordance with some example embodiments.

FIGS. 7A-7B are diagrams illustrating various lace tension detecting assemblies, according to some example embodiments.

Figure 1:
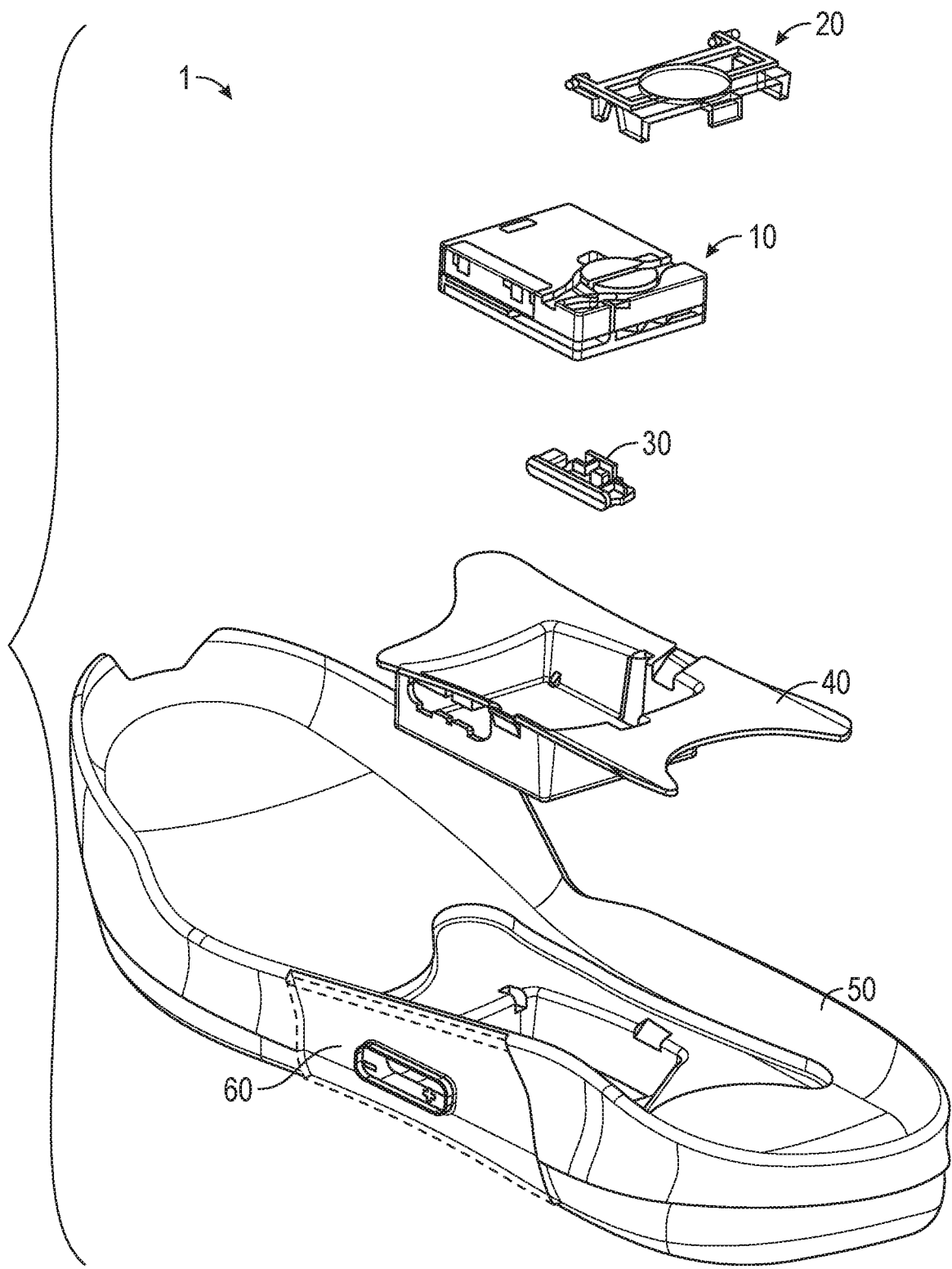
FIG. 1 is an exploded view illustration of components of a portion of a footwear assembly with a motorized lacing system, according to some example embodiments.

Any headings provided herein are merely for convenience and do not necessarily affect the scope or meaning of the terms used or discussion under the heading.

DETAILED DESCRIPTION

The concept of self-tightening shoe laces was first widely popularized by the fictitious power-laced Nike® sneakers worn by Marty McFly in the movie Back to the Future II, which was released back in 1989. While Nike® has since released at least one version of power-laced sneakers similar in appearance to the movie prop version from Back to the Future II, the internal mechanical systems and surrounding footwear platform employed do not necessarily lend themselves to mass production and/or daily use. Additionally, other previous designs for motorized lacing systems comparatively suffered from problems such as high cost of manufacture, complexity, assembly challenges, and poor serviceability. The present inventors have developed various concepts to deliver a modular footwear platform to accommodate motorized and non-motorized lacing engines that solves some or all of the problems discussed above, among others. In order to fully leverage the modular lacing engine discussed briefly below and in greater detail in co-pending application Ser. No. 15/450,860, titled "LACING APPARATUS FOR AUTOMATED FOORWEAR PLATFORM," the present inventors developed various alternative and complementary lacing engine designs, battery chargers, user interface concepts, and display/carrying cases discussed herein.

The motorized lacing engine discussed below in reference to FIG. 1, as well as alternative concepts discussed throughout, was developed from the ground up to provide a robust, serviceable, and inter-changeable component of an automated lacing footwear platform. The lacing engine includes unique design elements that enable retail-level final assembly into a modular footwear platform. The lacing engine design allows for the majority of the footwear assembly process to leverage known assembly technologies, with unique adaptions to standard assembly processes still being able to leverage current assembly resources.

In an example, the modular automated lacing footwear platform includes a mid-sole plate secured to the mid-sole for receiving a lacing engine. The design of the mid-sole plate allows a lacing engine to be dropped into the footwear platform as late as at a point of purchase. The mid-sole plate, and other aspects of the modular automated footwear platform, allow for different types of lacing engines to be used interchangeably. For example, the motorized lacing engine discussed below could be changed out for a human-powered lacing engine. Alternatively, a fully automatic motorized lacing engine with foot presence sensing or other optional features could be accommodated within the standard mid-sole plate.

Utilizing motorized or non-motorized centralized lacing engines to tighten athletic footwear presents some challenges in providing sufficient performance without sacrificing some amount of comfort. Lacing architectures discussed herein have been designed specifically for use with centralized lacing engines and are designed to enable various footwear designs from casual to high-performance.

This initial overview is intended to introduce the subject matter of the present patent application. It is not intended to provide an exclusive or exhaustive explanation of the various inventions disclosed in the following more detailed description.

Automated Footwear Platform

The following discusses various components of the automated footwear platform including a motorized lacing engine, a mid-sole plate, and various other components of the platform. While much of this disclosure focuses on lacing architectures for use with a motorized lacing engine, the discussed designs are applicable to a human-powered lacing engine or other motorized lacing engines with additional or fewer capabilities. Accordingly, the term "automated" as used in "automated footwear platform" is not intended to only cover a system that operates without user input. Rather, the term "automated footwear platform" includes various electrically powered and human-power, automatically activated and human activated mechanisms for tightening a lacing or retention system of the footwear.

FIG. 1 is an exploded view illustration of components of a motorized lacing system for footwear, according to some example embodiments. The motorized lacing system 1 illustrated in FIG. 1 includes a lacing engine 10, a lid 20, an actuator 30, a mid-sole plate 40, a mid-sole 50, and an outsole 60. FIG. 1 illustrates the basic assembly sequence of components of an automated lacing footwear platform. The motorized lacing system 1 starts with the mid-sole plate 40 being secured within the mid-sole. Next, the actuator 30 is inserted into an opening in the lateral side of the mid-sole plate opposite to interface buttons that can be embedded in the outsole 60. Next, the lacing engine 10 is dropped into the mid-sole plate 40. In an example, the lacing system 1 is inserted under a continuous loop of lacing cable and the lacing cable is aligned with a spool in the lacing engine 10 (discussed below). Finally, the lid 20 is inserted into grooves in the mid-sole plate 40, secured into a closed position, and latched into a recess in the mid-sole plate 40. The lid 20 can capture the lacing engine 10 and can assist in maintaining alignment of a lacing cable during operation.

In an example, the footwear article or the motorized lacing system 1 includes or is configured to interface with one or more sensors that can monitor or determine a foot presence characteristic. Based on information from one or more foot presence sensors, the footwear including the motorized lacing system 1 can be configured to perform various functions. For example, a foot presence sensor can be configured to provide binary information about whether a foot is present or not present in the footwear. If a binary signal from the foot presence sensor indicates that a foot is present, then the motorized lacing system 1 can be activated, such as to automatically tighten or relax (i.e., loosen) a footwear lacing cable. In an example, the footwear article includes a processor circuit that can receive or interpret signals from a foot presence sensor. The processor circuit can optionally be embedded in or with the lacing engine 10, such as in a sole of the footwear article.

Figure 2:
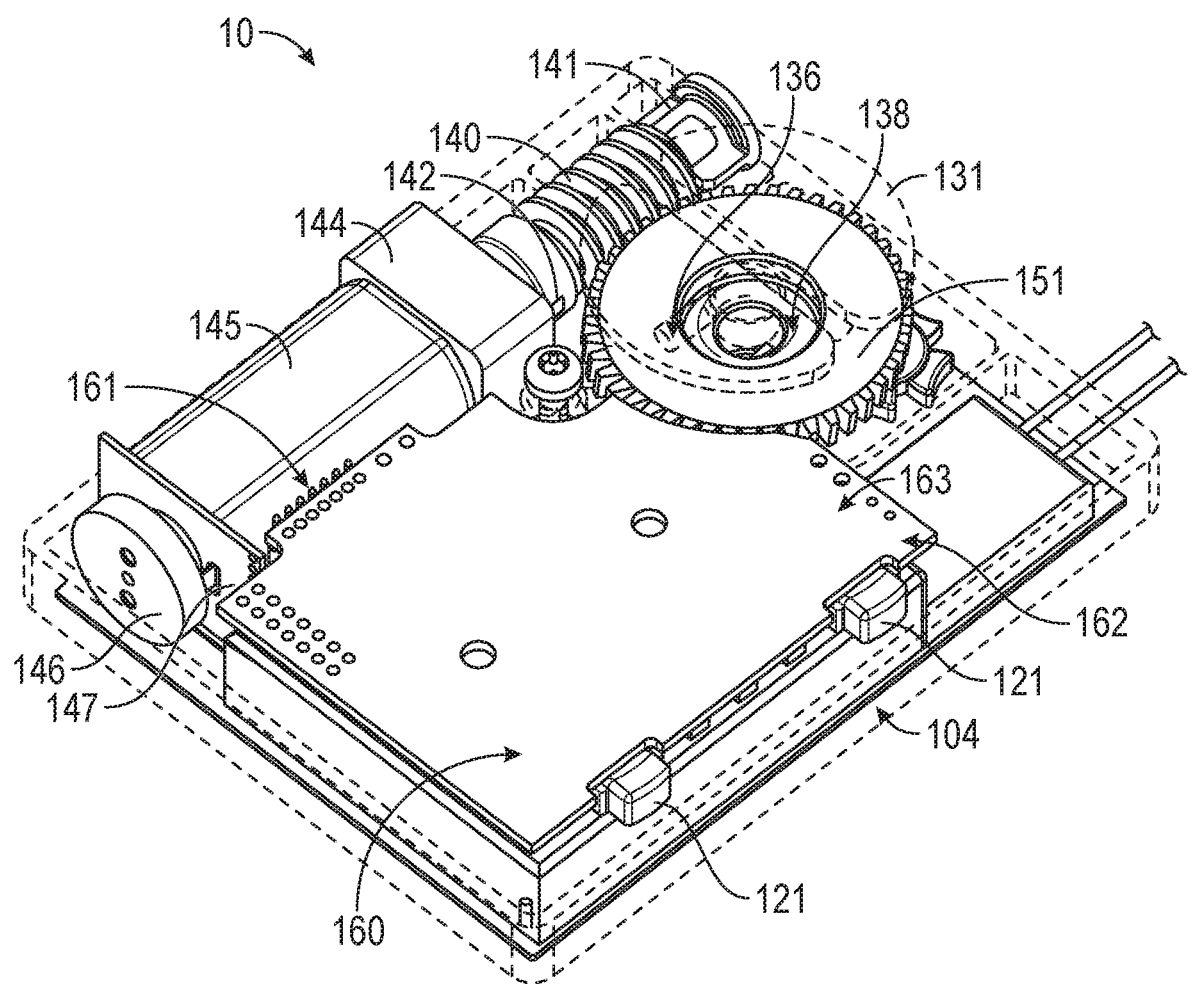
FIG. 2 is a perspective view of an example lacing engine and load cell force detection apparatus, according to some example embodiments.

FIG. 2 is an illustration of various internal components of lacing engine 10, according to example embodiments. FIG. 2 also illustrates how a load cell can be incorporated into a lacing engine, such as lacing engine 10. In this example, the lacing engine 10 further includes spool magnet 136, O-ring seal 138, worm drive 140, bushing 141, worm drive key 142, gear box 144, gear motor 145, motor encoder 146, motor circuit board 147, worm gear 150, circuit board 160, motor header 161, battery connection 162, and wired charging header 163. The spool magnet 136 assists in tracking movement of the spool 130 though detection by a magnetometer (not shown in FIG. 2C). The O-ring seal 138 functions to seal out dirt and moisture that could migrate into the lacing engine 10 around the spool shaft 133. In this example, the load cell can be incorporated outboard of bushing 141 to detect forces transmitted from the spool 130 through the worm gear 150 onto the worm drive 140. Information from the load cell can be used as an input to the tension control to tighten or loosen lace tension based on an inference on activity level being experienced by the footwear. For example, if the load cell is detecting frequent shock loading on the laces, it can be inferred that activity level of high (e.g., engaged in basketball game). Alternatively, if the load cell is detecting little or no shock loading, then the lacing engine can infer low activity level and potentially loosen the laces.

In this example, major drive components of the lacing engine 10 include worm drive 140, worm gear 150, gear motor 145 and gear box 144. The worm gear 150 is designed to inhibit back driving of worm drive 140 and gear motor 145, which means the major input forces coming in from the lacing cable via the spool 130 are resolved on the comparatively large worm gear and worm drive teeth. This arrangement protects the gear box 144 from needing to include gears of sufficient strength to withstand both the dynamic loading from active use of the footwear platform or tightening loading from tightening the lacing system. The worm drive 140 includes additional features to assist in protecting the more fragile portions of the drive system, such as the worm drive key 142. In this example, the worm drive key 142 is a radial slot in the motor end of the worm drive 140 that interfaces with a pin through the drive shaft coming out of the gear box 144. This arrangement prevents the worm drive 140 from imparting any axial forces on the gear box 144 or gear motor 145 by allowing the worm drive 140 to move freely in an axial direction (away from the gear box 144) transferring those axial loads onto bushing 141 and the housing structure 100. As noted above, the arrangement also allows for convenience placement of a load cell outboard of the bushing 141 to measure axial forces on the drive training from laces.

Within an automated footwear platform using an automatic lacing engine it may be important to detect various parameters regarding lace position and/or tension. The following discusses various concepts for detecting lace position and/or lace tension within a lacing engine, such as lacing engine 10 discussed above.

Figures 3A, 3B:
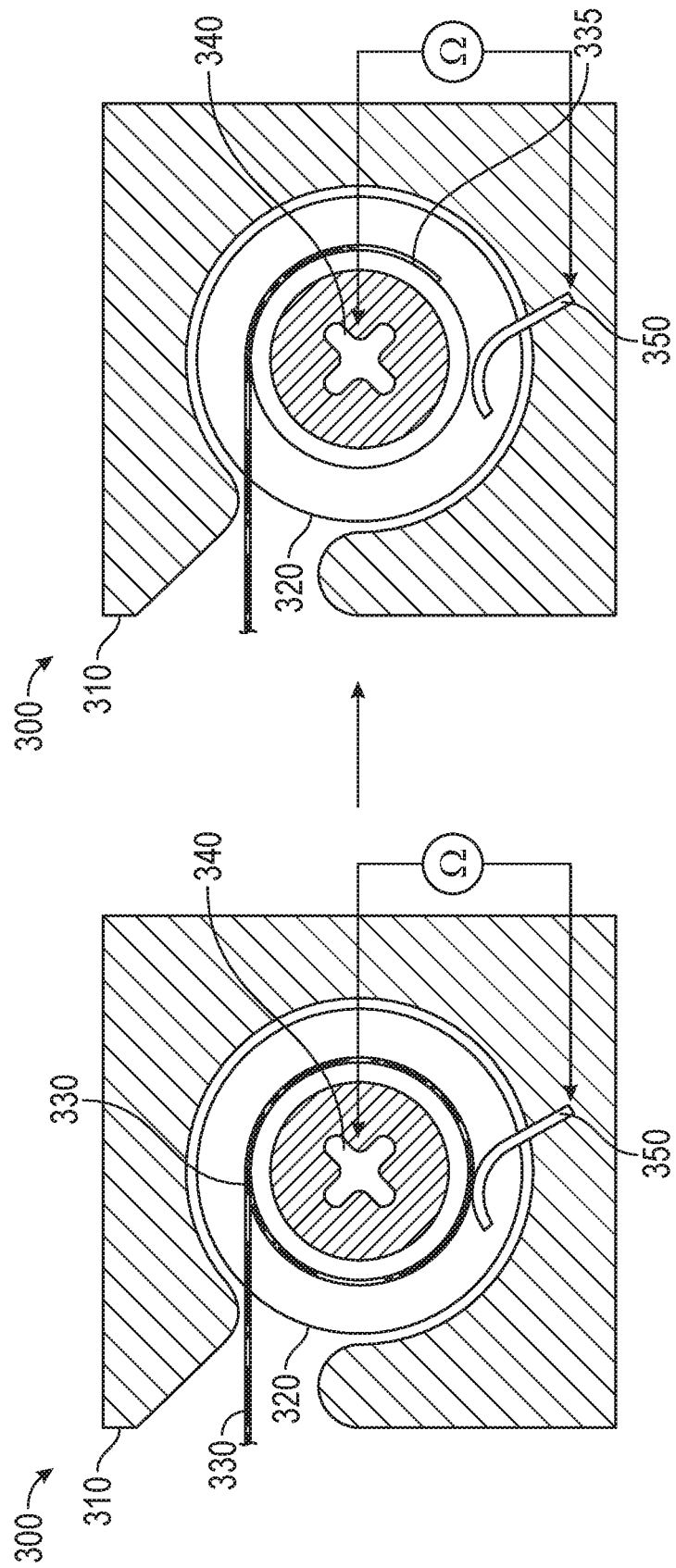
FIGS. 3A-3B are diagrams illustrating an electrode technique for detecting end of lace travel within an automated footwear platform, in accordance with some example embodiments.

FIGS. 3A-3B illustrate an electrode technique for directly detecting end of lace travel. In this example, a flexible electrode is positioned against a portion of the lace spool and impedance is measured across the electrode and spool. When lace is on the spool the impedance will be high, as the lace in this example is an insulator. Once the lace runs off the spool, the impedance will drop as the connection improves. In this example, the end of the lace cable is measured directly through the change in impedance measurement. FIG. 3A illustrates the system with some lace on the spool, while FIG. 3B illustrates the system where the lace has run off the spool (at least in the location of the electrode 350).

In this example, the lacing engine 300 includes components such as a housing 310, a lace spool 320, a lace cable 330, a lace end 335, a spool hub 340, and an electrode 350. The lace cable 330 is taken up or released by the lace spool 320. The electrode 350 measures impedance across a circuit created between the electrode 350 and the lace spool 320. In this example, the lace spool 320 acts as an electrical conductor and the lace cable 330 acts as an insulator. Accordingly, when there is lace cable wound on the lace spool 320, the electrode 350 is not in contact with the lace spool 320 and the electrical circuit is complete, resulting a high impedance through the circuit. When the lace cable 320 runs off the lace spool 320, the electrode 350 is able to contact the lace spool 320 and complete an electrical circuit. The impedance across this circuit drops when the electrode 350 contacts the lace spool 320, which can be detected by a controller circuit in the lacing engine 310. As illustrated in FIG. 3B, when the lace end 335 moves past the electrode 350, the electrode 350 comes into contact with the lace spool 340. Once in contact with the conductive lace spool 340, the electrode 350 completes a low impedance electrical circuit.

In an example, the lace cable can be made from a material with a known impedance, which can allow for the electrode 350 to provide data to a controller circuit to approximate the amount of lace cable on the lace spool. In this example, the width of the lace cable would produce a known impedance level when measured across the circuit produced by the electrode 350 and the lace spool 320. Each wrap of lace cable operates to increase the distance between the electrode 350 and the lace spool 320, which would increase the impedance level by a known quantity. As the impedance produced by the lace cable wrapping around the lace spool will not be extremely precise, impedance measurement can be translated into an approximation of the amount of lace cable wrapped around the lace spool. In certain examples, the lace spool may be sized in a manner where each wrap of lace cable does not always increase the gap between the electrode and the lace spool by the width of the lace cable, in these examples the impedance measure provides a rougher approximation of lace cable on the lace spool. In some examples, the impedance measurement between the electrode 350 and lace spool 320 can provide aproximations, such as the lace spool is full, ¾ full, ½ full, ¼ full, or empty.

FIGS. 4A-4B illustrate a lever and divot assembly for detecting lace position (e.g., end of lace travel). In this example, a spring-loaded lever rides against the lace spool and drops into a divot in the lace spool when the lace runs off the spool. A switch or position sensor can detect when the spring-loaded lever drops into the divot. FIG. 4A illustrates the interaction between the lever and lace spool prior to the lace end running past the lever. FIG. 4B illustrates the condition when the lever drops into the divot after the lace end runs past the lever. The end of travel condition of the lace cable is directly measured by the lever when the lace cable unwraps off the lace spool and allows the lever to drop into the divot in the lace spool.

In this example, the lacing engine 400 can include components such as a housing 410, a lace spool 420, a lace cable 430, a lace end 435, a spool hub 440, a position divot 445, and a lever 450. The lever 450 can be spring-loaded and include an integrated cut-off switch to control a motor within the lacing engine. In this example, the lever 450 pivots on a pivot point 455 integrated into the housing 410. The integrated cut-off switch is activated when the lever 450 drops into the divot 445 in the lace spool 420. The divot 445 is integrated into the inner surface of the lace spool 420 where the lace cable 430 is taken up. With at least one full wrap of lace cable 430 on the lace spool 420, the divot 445 is covered by the lace cable 430, so the lever 450 remains in the normal position with the cut-off switch not activated. When the lace spool 420 runs the lace end 435 pass the lever 450, the lever 450 is free to drop into the divot 445 and activate the cut-off switch stopping the motor. In an example, the lever 450 is substantially the same width (or depth into the illustration) as the width of the lace spool 420, this allows any amount of lace cable 430 on the lace spool 420 to keep the lever 450 from dropping into the divot 435.

Figure 5B:
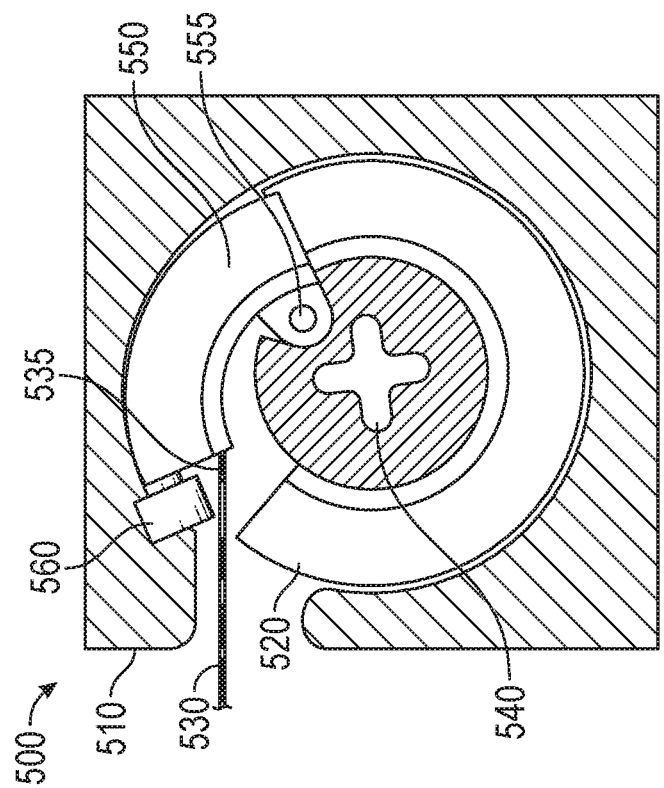
FIGS. 5A-5B are diagrams illustrating a split-spool assembly to detect end of lace travel within an automated footwear platform, in accordance with some example embodiments.
Figure 5A:
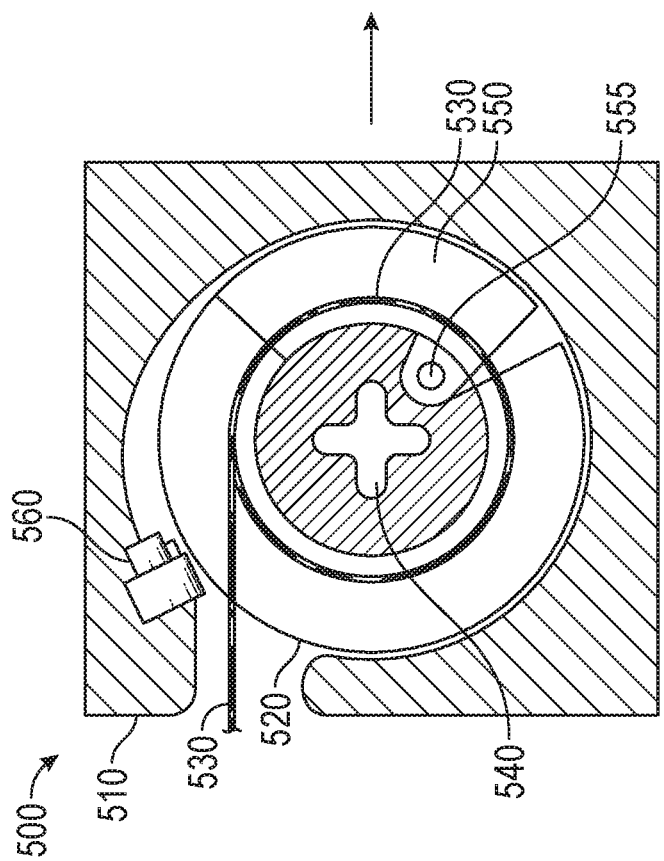

FIGS. 5A-5B illustrate a split-spool configuration to detect end of lace travel. FIG. 5A illustrates the split-spool in a closed state, where there remains lace on the lace spool. FIG. 5B illustrates the split-spool in an open state, where the lace has run off the lace spool and causes the hinged (split) portion to extend and activate a cut-off switch. In this example, the lace spool includes a hinged portion that is held down against the spool when lace is wrapped around the spool. As the lace wraps off the spool, the hinged portion is pulled up into a switch or sensor. Thus, the end of lace travel condition is directly measured or detected when the lace cable pulls the hinged portion off the lace spool and contacts the cut-off switch or sensor.

In this example, the lacing engine 500 can include structures such as a housing 510, a split lace spool 520, a lace cable 530, a lace end 535, a spool hub 540, a hinged portion 550 (also referred to as a split spool section 550), a pivot 555, and a cut-off switch 560. The lace cable 530 wraps around the split lace spool 520, which holds the hinged portion 550 in place as the split lace spool 520 rotations about spool hub 540. When the lace cable 530 unwraps from the split lace spool 520, the hinged portion 550 pivots about pivot 555 and contacts cut-off switch 560. When the hinged portion 550 contacts the cut-off switch 560 the lace spool 520 stops counter-clockwise rotation and any motor input is shut down. The lace cable 530 is connected to the hinged portion 550 at lace end 535. After the hinged portion 550 contacts the cut-off switch 560, the lacing engine 500 can reverse (e.g., start clockwise rotation) to take-up lace cable 530 onto the split lace spool 520. Clockwise rotation of the lace spool 520 will cause the hinged portion 550 to pivot back into place on the split lace spool 520, as lace cable 530 is wrapped onto the split lace spool 520.

FIGS. 6A-6B illustrate an optical sensor to detect different markings on a lace cable. In this example, the lace cable can include characteristics, such as color, pattern, texture, or similar markings, which are detectable by an optical sensor. The markings or characteristics can be used to detect certain specific locations on the lace cable, and/or operate like an encoder with markings at regular intervals. In other words, the optical sensor allows for direct detection or measurement of characteristics of the lace cable as it is manipulated by the lacing engine. As shown in FIG. 6A, the lace cable can include alternating (or similar pattern) of different colors that can be detected by an optical sensor. Different colors on various sections of the lace cable can provide a control circuit within an automated lacing engine valuable information about lace travel and/or footwear tightness. For example, using alternating color patterns, a control circuit can receive regular triggers from an optical sensor, which can be used like an encoder signal to track lace cable location (e.g., how much lace cable has been pulled in by the lacing engine).

In this example, the lacing engine 600 can include components such as a housing 610, a lace spool 620, a lace cable 630, a lace end section 635, a spool hub 640, and an optical sensor 660. The optical sensor 660 can be utilized to identify transitions between different colored or shaded sections of a lace cable, such as lace cable 620. In FIGS. 6A and 6B, the lace cable 620 is illustrated as having a section of alternating color or shade (shown as alternating shades), as well as a lace end section 635 of a solid color or shade specific to the end of the lace cable. The optical sensor 660 is tuned to identify each different transition and color/shade state during operation of the lacing engine 600. Data from the optical sensor 660 can be sent to a control circuit, which can use the data to determine amount of lace on the lace spool, speed of lace retraction or extension, or end of lace (e.g., lace end section 635), among other things.

Lace Tension Detection Concepts

Figure 7B:
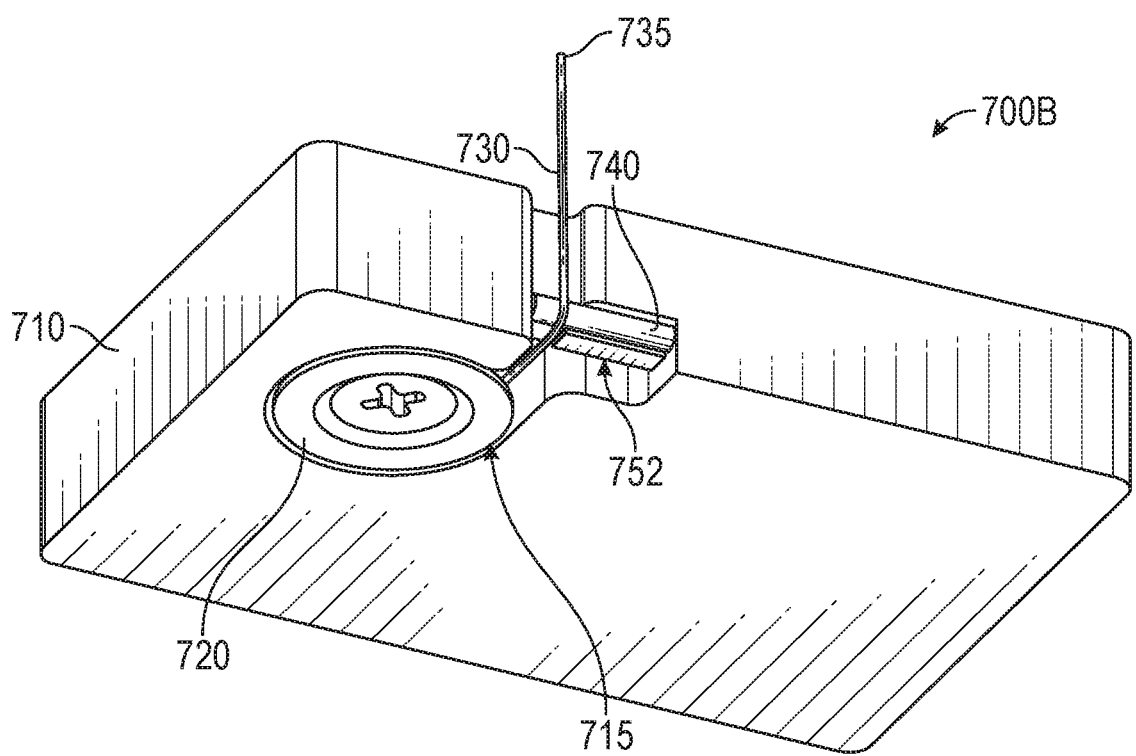

FIGS. 7A-7B are diagrams illustrating various lace tension detecting assemblies, according to some example embodiments. These example assemblies can be integrated into a lacing engine for an automated footwear platform, such as those discussed above. FIG. 7A illustrates a force sensor pulley combination used to detect lace cable tension. In this example, the lace wraps around (90 degrees) a pin or pulley with a force sensor positioned to sense forces imparted on the pin/pulley by the lace cable. In this example, the pin/pulley defects under load in a predicable manner, which can then be measured by the force sensor. Alternatively, the pin or pulley can be mounted too the force sensor to enable direct detection and/or measurement of the lace cable tension. In a similar configuration, a position sensor is used to detect movement of the pin/pulley, which is then translated into a force.

In this example, the lacing engine 700A can include components such as a housing 710, a spool cavity 715, a lace spool 720, a lace cable 730, a lace free end 735, a pulley 740, and a sensor 750. The housing 710 can include a spool cavity 715 designed to receive a lace spool 720, which can be rotated to take-up or release lace cable 730. One of the primary functions of a lacing engine, such as lacing engine 700A is to tension a lace cable to secure a footwear platform to a user's foot. In an example, the sensor 750 can detect movement of the pulley (or pin) 740, which can be translated into a force or tension being applied to the lace cable 730. In another example, the sensor 750 can be a force sensor that directly reads a force being applied against the pulley 740 by the lace cable 730 as it exits the lacing engine 700A. In either example, the data generated by the sensor 750 can be delivered to a control circuit, which can utilize the data to control tightening or loosening of the lace cable 730 through control of the lacing engine 700A.

FIG. 7B illustrates a strain gauge configuration for sensing lace tension. In this example, a strain gauge can be positions on a bar or structure where the lace exits the lacing engine. The lace can exit the spool and make a 90 degree turn around a structure including the strain gauge. The structure and strain gauge can be calibrated to allow for measurement of the lace tension. In this example, the lacing engine 700B can include components such as a housing 710, a spool cavity 715, a lace spool 720, a lace cable 730, a lace free end 735, a pulley (or pin) 740, a sensor 750, and a strain gauge 752. In this example, the lace cable tension is measured by a strain gauge, such as strain gauge 752, on the pin 740. As the lace cable 730 wraps around pin 740, the tension on the lace cable 730 causes deflection in the pin 740, which is measured by the strain gauge 752. In this example, the lace cable 730 is taken up by the lace spool 720 as it makes a 90 degree turn around the pin 740. The 90 degrees turn around pin 740 imparts sufficient forces against the pin 740 for the strain gauge 752 to measure the defection caused by the tension on lace cable 730.

Figure 8A:
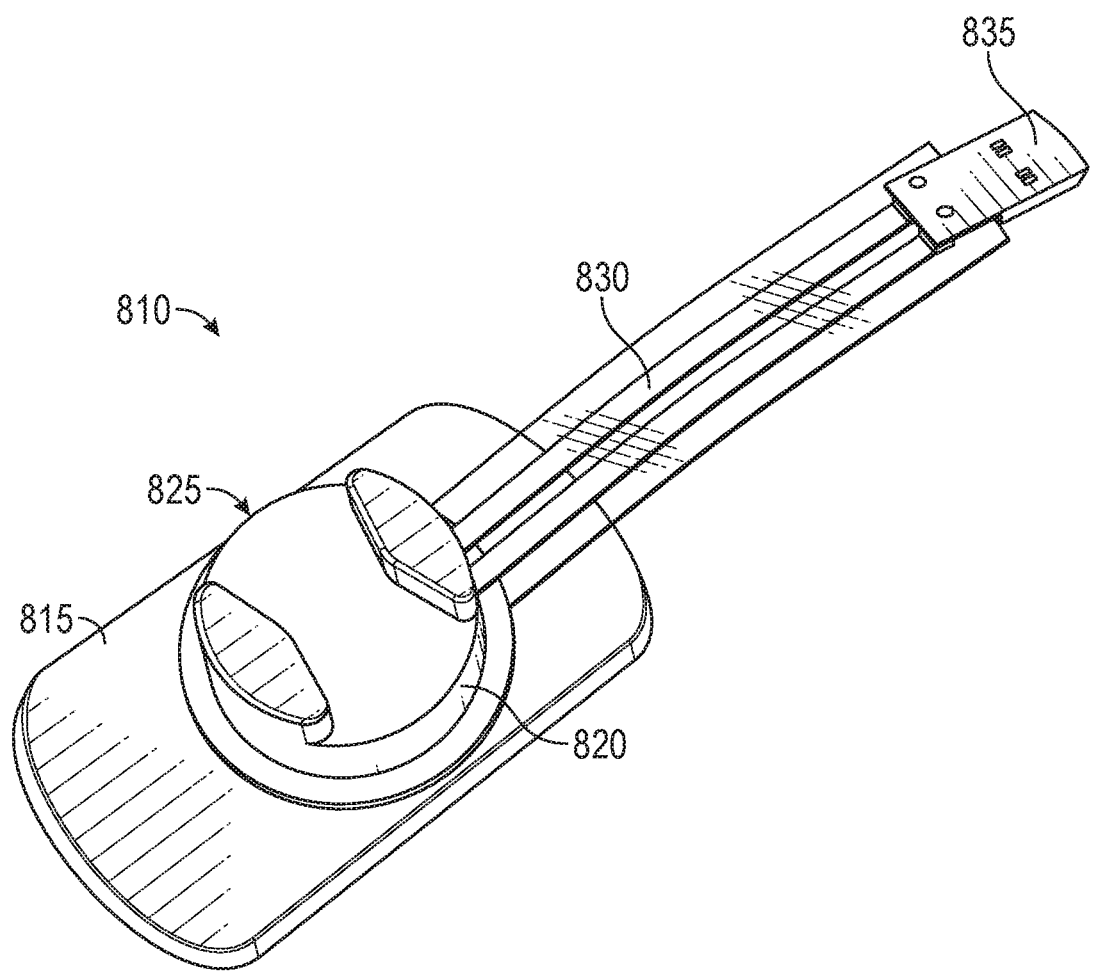
FIGS. 8A-8B are diagrams illustrating a force sensing resistor-based lace tension detection assembly, according to some example embodiments.
Figure 8B:
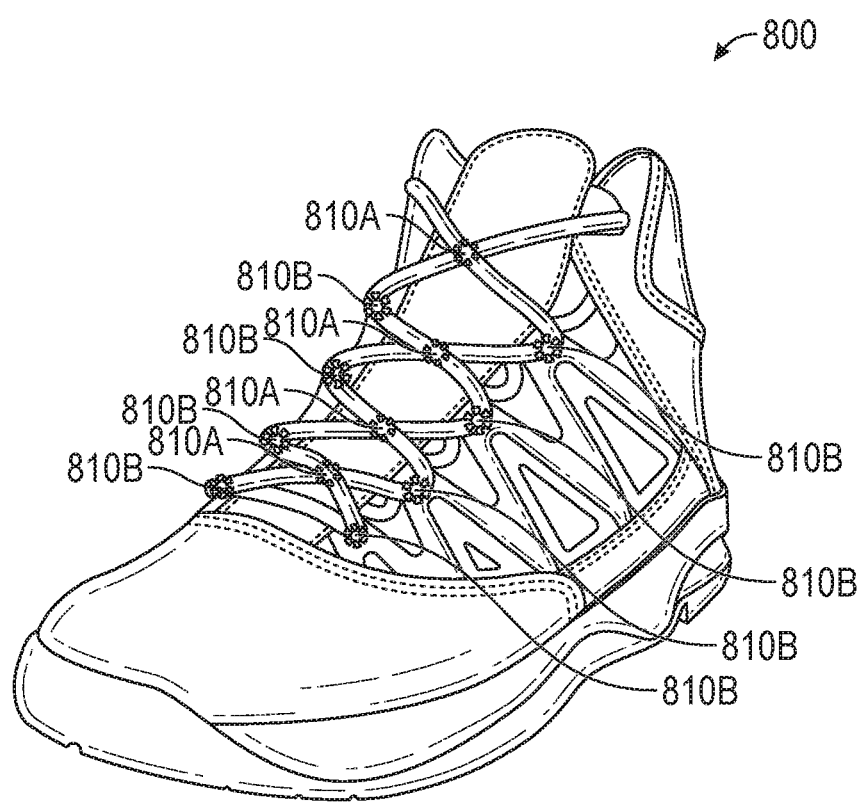

FIGS. 8A-8B illustrate a direct pressure sensing technique. In this example, the tongue of a footwear assembly can include one or more force sensing resistors (FSRs). The FSRs can detect lace tension across the upper portion of the footwear assembly. In this example, the FSRs can be positions along the underside of the tongue to press against the foot of the user. FIG. 8A illustrates an individual FSR (sensor assembly 810) designed to be positioned at a lace cable junction. FIG. 8B illustrates a footwear platform with various FSR locations, such as sensor assembly locations 810A and 810B.

In this example, the sensor assembly 810 can include components such as a sensor platform 815, a lace guide 825, a circuit 830, and a connector 835. The sensor platform 815 provides a base for the sensor assembly and it can be designed for integration into various locations within the footwear platform. The lace guide 825 can be designed to receive one or more portions of a lace cable and guide the lace cable over the force sensing resistor. The circuit 830 can include a calibrated resistor that outputs a resistance measurement that is proportional to an amount of force exerted on the sensor assembly 810. The connector 835 is used to interconnect sensor assemblies back to a control circuit within the footwear platform.

EXAMPLES

Example 1 describes subject matter including a lacing engine for an automated footwear platform. The lacing engine can includes components such as a housing, a lace spool, and a detection mechanism. The lace spool can be at least partially disposed within the housing. The lace spool can also be adapted to collect a portion of a lace cable in response to rotation in a first direction during tightening of the footwear platform. The detection mechanism can directly measure a characteristic of the lace cable while the lace cable is manipulated by the lacing engine.

In Example 2, the subject matter of Example 1 can optionally include the detection mechanism having an electrode adapted to measure an electrical parameter.

In Example 3, the subject matter of Example 2 can optionally include the electrode being adapted to contact a portion of the lace spool with the lace cable is in a first state.

In Example 4, the subject matter of Example 3 can optionally include the electrode completing an electrical circuit through the lace spool when the lace cable is in the first state.

In Example 5, the subject matter of Example 4 can optionally include the electrical circuit exhibiting a low impedance measurement when the lace cable is in the first state.

In Example 6, the subject matter of Example 5 can optionally include the first state of the lace cable being a fully extended state wherein only a portion of the lace spool contacts any lace cable.

In Example 7, the subject matter of any one of Examples 2 to 6 can optionally include the electrode being adapted to contact the lace cable when the lace cable is in a second state.

In Example 8, the subject matter of Example 7 can optionally include a circuit including the electrode and the lace spool, where the circuit exhibits a high impedance measurement when the lace cable is in the second state.

In Example 9, the subject matter of any one of Examples 2 to 8 can optionally include the electrode being spring-loaded to maintain contact against the lace spool with or without lace cable wrapped around the lace spool. In this example, the electrode can maintain contact throughout a useable range of use for the lace spool (e.g., between a first state (empty) and a second state (full)).

In Example 10, the subject matter of Example 1 can optionally include the detection mechanism including a lever including a free end adapted to follow a contour of the lace spool and a pivot end.

In Example 11, the subject matter of Example 10 can optionally include the lace spool having a divot adapted to receive at least a portion of the free end of the lever.

In Example 12, the subject matter of Example 11 can optionally include the detection mechanism including a sensor to detect when the free end of the lever is received within the divot.

In Example 13, the subject matter of any one of Examples 11 and 12 can optionally include the lace spool being adapted to collect the lace cable upon rotation in a first direction, and where upon collecting at least a first portion of the lace cable the free end of the lever cannot be received within the divot.

In Example 14, the subject matter of any one of Examples 11 to 13 can optionally include the detection mechanism having a cut-off switch activated upon receiving the free end of the lever in the divot.

In Example 15, the subject matter of Example 14 can optionally include the cut-off switch operating to cut-off power to a motor operating the lacing engine.

In Example 16, the subject matter of Example 1 can optionally include the detection mechanism including a cut-off switch and a split portion of the lace spool.

In Example 17, the subject matter of Example 16 can optionally include the split portion of the lace spool having a curved section of the lace spool pivotably coupled to the lace spool.

In Example 18, the subject matter of any one of Examples 16 and 17 can optionally include the lace cable being fixed to a first end of the split portion, wherein the first end is opposite a second end that is pivotably coupled to the lace spool.

In Example 19, the subject matter of any one of Examples 16 to 18 can optionally include the cut-off switch being positioned along the housing such that a first end of the split portion of the lace spool contacts the cut-off switch when the lace cable is in a first state.

In Example 20, the subject matter of any one of Examples 16 to 19 can optionally include, upon the lace cable reaching the first state, continued rotation of the lace spool causing the split portion to pivot radially outward into contact with the cut-off switch.

In Example 21, the subject matter of Example 1 can optionally include the detection mechanism including an optical sensor adapted to sense a characteristic of the lace cable.

In Example 22, the subject matter of Example 21 can optionally include the optical sensor being adapted to sense a transition from a first section of the lace cable to a second section of the lace cable.

In Example 23, the subject matter of Example 22 can optionally include the first section of the lace cable being a first color and the second section of the lace cable being a second color.

In Example 24, the subject matter of Example 23 can optionally include the first section of lace cable having a first pattern within the lace cable and the second section having a second pattern within the lace cable.

In Example 25, the subject matter of any one of Examples 21 to 24 can optionally include the optical sensor being adapted to detect an end portion of the lace cable.

In Example 26, the subject matter of Example 25 can optionally include the end portion of the lace cable having a unique color or a unique pattern in reference to the remainder of the lace cable.

In Example 27, the subject matter of Example 1 can optionally include the detection mechanism including a force sensor to detect tension on the lace cable.

In Example 28, the subject matter of Example 27 can optionally include the detect mechanism including a pin or a pulley receiving a portion of the lace cable.

In Example 29, the subject matter of Example 28 can optionally include the force sensor contacting the pin or the pulley to detect tension transmitted to the pin or the pulley by the portion of the lace cable.

In Example 30, the subject matter of Example 29 can optionally include the portion of the lace cable wraps around 90 degrees of the circumference of the pin or the pulley.

In Example 31, the subject matter of Example 1 can optionally include the detection mechanism including a strain gauge to detect tension on the lace cable.

In Example 32, the subject matter of Example 31 can optionally include the detection mechanism including a pin or a pulley positioned adjacent to the lace spool exit to receive a portion of the lace cable around the circumference of the pin or the pulley.

In Example 33, the subject matter of Example 32 can optionally include the strain gauge being integrated into the pin or the pulley to detect strain induced by tension on the lace cable.

Additional Notes

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The disclosure, therefore, is not to be taken in a limiting sense, and the scope of various embodiments includes the full range of equivalents to which the disclosed subject matter is entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method (process) examples described herein, such as the footwear assembly examples, can include machine or robotic implementations at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. An Abstract, if provided, is included to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention includes:

1. A lacing engine for an automated footwear platform, the lacing engine comprising:
   a housing;
   a lace spool at least partially disposed within the housing, the lace spool adapted to collect a portion of a lace cable in response to rotation in a first direction during tightening of the footwear platform; and
   a detection mechanism to directly measure a characteristic of the lace cable while the lace cable is manipulated by the lacing engine,
   wherein the detection mechanism includes an electrode adapted to measure an electrical parameter, and wherein the electrode is adapted to contact a portion of the lace spool with the lace cable is in a first state.

2. The lacing engine of claim 1, wherein the electrode completes an electrical circuit through the lace spool when the lace cable is in the first state.

3. The lacing engine of claim 2, wherein the electrical circuit exhibits a low impedance measurement when the lace cable is in the first state.

4. The lacing engine of claim 3, wherein the first state of the lace cable is a fully extended state wherein only a portion of the lace spool contacts any lace cable.

5. The lacing engine of any one of claims 1 and 2-4, wherein the electrode is adapted to contact the lace cable when the lace cable is in a second state.

6. The lacing engine of claim 5, further comprising a circuit including the electrode and the lace spool, the circuit exhibiting a high impedance measurement when the lace cable is in the second state.

7. The lacing engine of any one of claims 1 and 2-4, wherein the electrode is spring-loaded to maintain contact against the lace spool with or without lace cable wrapped around the lace spool.

8. A lacing engine for an automated footwear platform, the lacing engine comprising:
   a housing;
   a lace spool at least partially disposed within the housing, the lace spool including a recess to collect a portion of a lace cable in response to rotation in a first direction during tightening of the footwear platform; and
   a detection mechanism including a circuit comprising an electrode biased against the lace cable within the recess of the lace spool to measure an impedance across the lace spool, wherein the measured impedance of the circuit provides a measure of an amount of lace cable present on the lace spool.

9. The lacing engine of claim 8, wherein the electrode completes an electrical circuit through the lace spool when the lace cable is in the first state.

10. The lacing engine of claim 9, wherein the electrical circuit exhibits a low impedance measurement when the lace cable is in the first state.

11. The lacing engine of claim 10, wherein the first state of the lace cable is a fully extended state wherein only a portion of the lace spool contacts any lace cable.

12. The lacing engine of claim 8, wherein the electrode is adapted to contact the lace cable when the lace cable is in a second state.

13. The lacing engine of claim 12, further comprising a circuit including the electrode and the lace spool, the circuit exhibiting a high impedance measurement when the lace cable is in the second state.

14. A lacing engine for an automated footwear platform, the lacing engine comprising:
- a lace spool including a recess to collect a portion of a lace cable in response to rotation in a first direction during tightening of the footwear platform;
- a detection mechanism including a circuit configured to measure impedance across the recess of the lace spool; and
- a controller circuit to determine an amount of lace cable on the lace spool based on the impedance measurement,
- wherein the detection mechanism includes an electrode biased against the lace cable to measure the impedance across the lace spool.

15. The lacing engine of claim 14, wherein the circuit exhibits a low impedance measurement when the lace cable is in the first state and the controller circuit estimates zero lace cable on the lace spool based on the low impedance measurement.

16. The lacing engine of claim 15, wherein the first state of the lace cable is a fully extended state wherein only a portion of the lace spool contacts any lace cable.

17. The lacing engine of claim 14, wherein an electrode within the circuit is adapted to contact the lace cable when the lace cable is in a second state.

18. The lacing engine of claim 17, wherein the circuit exhibits a high impedance measurement when the lace cable is in the second state and the controller circuit estimates the amount of lace cable on the lace spool based on the high impedance measurement.

* * * * *